C. J. COBERLY.
MECHANICAL MOVEMENT.
APPLICATION FILED MAR. 1, 1917.
1,284,598.
Patented Nov. 12, 1918.
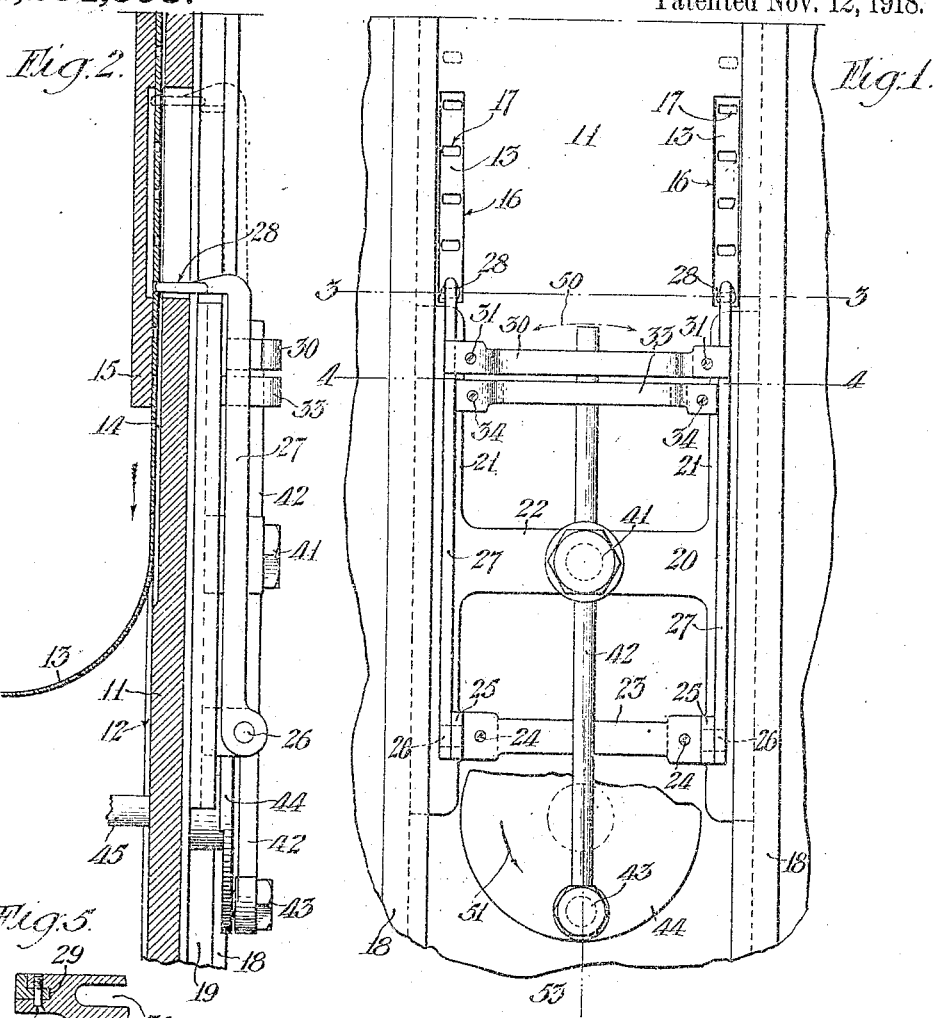
Inventor
Clarence J. Coberly
by Graham Harris
Attorneys

UNITED STATES PATENT OFFICE.

CLARENCE J. COBERLY, OF LOS ANGELES, CALIFORNIA, ASSIGNOR, BY MESNE ASSIGNMENTS, TO MOTION PICTURE APPARATUS CO., INC., OF NEW YORK, N. Y., A CORPORATION OF NEW YORK.

MECHANICAL MOVEMENT.

1,284,598.  Specification of Letters Patent.  Patented Nov. 12, 1918.

Application filed March 1, 1917. Serial No. 151,852.

*To all whom it may concern:*

Be it known that I, CLARENCE J. COBERLY, a citizen of the United States, residing at Los Angeles, in the county of Los Angeles and State of California, have invented a new and useful Mechanical Movement, of which the following is a specification.

My invention comprises a new mechanical movement which is especially adapted for use in the motion picture camera for the purpose of imparting intermittent motion to the film. In the motion picture art, celluloid or other photographic film having perforations along its edge is intermittently moved to expose successive portions thereof. My invention is particularly adapted to impart this intermittent motion to the film, although it may be used for other purposes.

Referring to the drawings, which are for illustrative purposes only:

Figure 1 is a front view of the mechanism as assembled.

Fig. 2 is a side view, partly in section, of the same mechanism.

Fig. 3 is a sectional, plan view on line 3—3 Fig. 1.

Fig. 4 is a sectional plan view, on line 4—4 Fig. 1.

Fig. 5 is a sectional, plan view of one of the fingers and its connection to the cam plate.

Referring to the drawings, 11 designates a wall having a vertically extending groove 12 on its rear face in which a film 13 is slidably arranged. The central portion of the groove 12 is recessed, as indicated at 14, so that the sensitized face of the film does not rub against the wall, the film being held in the groove 12 by the film gate 15. Arranged vertically, and extending through the wall 11, are two slots or openings 16 which are so arranged that that portion of the film having a hole 17 therein is directly behind the respective slots 16.

18, 18 designates guides secured to the front of the wall 11 in any suitable manner, such guides being provided with vertical grooves 19 in which is slidably mounted a carriage plate 20, which carriage plate consists of two vertical members 21, a central cross bar 22, and a lower cross bar 23 rigidly connected to the members 21 by suitable screws 24. The bar 23 terminates at each end in lugs 25, each lug having therein a pin 26 upon which is pivotally mounted an arm 27, the upper end of which terminates in an inwardly projecting finger 28 adapted to extend into the hole 17 in the film. The arms 27, near their upper ends, are provided with lugs 29 which extend into a slot formed in the end of a cam plate 30, being secured thereto by means of screws 31, so that the cam plate 30 and arms 27 move as one piece. Directly under the cam plate 30 is a guide plate 33 secured by means of suitable screws 34 to lugs 35 formed on the carriage plate 20, the ends of the guide plate 33 being adapted to engage the inner face of the respective arms 27 to prevent a chattering or sidewise movement of said arms 27.

Formed in the cam plate 30 is a slot 36 which consists of two parallel portions 37 and 38 connected by an inclined portion 39. The guide plate 33 is provided with a slot 40 which extends in the same general direction as the straight portions of the slot 36 in the cam plate 30 and which is directly under the center or middle of the inclined portion 39 of the slot 36.

Pivotally mounted on a pin 41 supported on the carriage plate 20 is a connecting rod 42, the lower end of which is pivotally connected by means of a pin 43 to a crank disk 44 rigidly secured to a shaft 45, which shaft is driven by suitable mechanism, not shown. The upper end of the connecting rod extends through the slot 40 in the guide plate 33 and through the slot 36 in the cam plate 30.

The object of the invention is to move the film 13 downwardly intermittently by the rotation of the shaft 45. The rotation of the shaft 45 rotates the crank pin 43 which is connected with the carriage plate 20 through the connecting rod 42, so that the carriage plate 20 moves up and down in the guides 18 a distance equal to twice the radius of the crank pin 43 for each revolution of the shaft 45. The connecting rod 42 being pivoted at 41, the upper end of the connecting rod swings on an arc of a circle, denoted by the dotted line 50 in Fig. 1, slidably moving back and forth in the slot 40 of the guide plate and the slot 36 of the cam plate. The configuration of the slot 36 in the cam plate is such that when the upper end of the connecting rod 42 is in the portion 38 of the slot 36, the cam plate 30 is moved outwardly from the carriage plate 20, which movement carries the arms 27 outwardly from the carriage plate, so that the fingers 28 are moved out of engagement with the holes 17 in the film 13, so that the plate 20 may slide without imparting any movement to the film. With the shaft 45 moving in the direction of the arrow 51, this will occur on the up stroke of the carriage plate 20. As the pin 43 passes through its upper position on the center line of the device denoted by the dotted line 53 in Fig. 1, the upper portion of the connecting rod 42 passes through the inclined portion 39 of the slot 36, thereby moving the cam plate and arms 27 inwardly, the fingers 28 projecting through the holes in the film 13 where they remain in engagement with the film during the downward movement of the carriage plate 20, thereby moving the film downwardly, the fingers 28 being disengaged from the film as the crank pin 43 again passes through the center line at the extreme lower portion of its movement. The upper end of the connecting rod 42 is guided in its arc movement by means of the guide plate 33. The rod 42 swinging in the slot 40 of the guide plate, and being directly under the cam plate 30, prevents a chattering or back and forth movement of the connecting rod 42 as the same operates to move the cam plate, as above described.

I claim as my invention:—

1. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft; a crank formed on said shaft; a connecting rod pivoted on said crank at its lower end; means for pivotally connecting said connecting rod intermediate its length to said carriage plate; means by which the oscillation of the upper end of said connecting rod raises and depresses the free ends of said radius arms; and means on said carriage plate for preventing lateral movement of said radius arms.

2. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft; a crank formed on said shaft; a connecting rod pivoted on said crank; means for pivotally connecting said rod intermediate its length to said carriage plate; a cam plate carried on the free end of said radius arms and engaged by the upper end of said connecting rod and so formed that the free ends of said radius arms are moved toward and away from said carriage plate as said connecting rod oscillates about its pivot on said carriage plate; means for guiding the upper end of said connecting rod; and means on said carriage plate for preventing lateral movement of said radius arms.

3. A mechanical movement for intermittently moving a strip of material having perforations along either edge thereof; comprising a support having parallel guides thereon; a carriage plate sliding in said guides; radius arms pivoted on said carriage plate; fingers formed on the free ends of said radius arms and properly located and proportioned to engage said perforations when said radius arms are depressed; an actuating shaft; a crank formed on said shaft; a connecting rod pivoted on said crank and on said carriage plate; means by which the oscillation of said connecting rod about its pivot on the carriage plate raises and depresses the free ends of said radius arms; and means on said carriage plate for guiding said connecting rod.

4. A mechanical movement for intermittently moving a strip of material having perforations along the edges thereof; comprising a support having parallel guides thereon; a carriage plate sliding in said guides; radius arms pivoted on said carriage plate; fingers formed on the free ends of said radius arms and properly located and proportioned to engage said perforations when said radius arms are depressed; an actuating shaft; a crank formed on said shaft; a connecting rod pivoted on said crank at its lower end; means for pivotally connecting said rod intermediate its length to said carriage plate; a cam plate carried on the free end of said radius arms and engaged by the upper end of said connecting rod and having a cam slot therein so formed that the free ends of said radius arms are moved toward and away from said carriage plate as said connecting rod oscillates about its pivot on said carriage plate; and a guide plate mounted on said carriage plate having a straight slot therein through which the upper end of said connecting rod extends into the slot in the cam plate.

5. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft for reciprocating said carriage plate; a crank formed on said shaft; a rod pivotally connected at one end on said crank; means for pivotally mounting said rod intermediate its ends on said carriage plate, whereby the free end thereof is adapted to oscillate; and means by which the oscillation of the free end of said rod is adapted to raise and depress the free ends of said radius arms.

6. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft for reciprocating said carriage plate; a crank formed on said shaft; a rod pivotally connected at one end on said crank; means for pivotally mounting said rod intermediate its ends on said carriage plate, whereby the free end thereof is adapted to oscillate; means by which the oscillation of the free end of said rod is adapted to raise and depress the free ends of said radius arms; and means for preventing lateral movement of said radius arms.

7. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft for reciprocating said carriage plate; a crank formed on said shaft; a rod pivotally connected at one end on said crank; means for pivotally mounting said rod intermediate its ends on said carriage plate, whereby the free end thereof is adapted to oscillate; means by which the oscillation of the free end of said rod is adapted to raise and depress the free ends of said radius arms; and means for guiding the free end of said oscillating rod.

8. A mechanical movement for intermittently moving a strip of material comprising a support having parallel guides thereon; a carriage plate sliding in said guides; radius arms pivoted on said carriage plate; means carried on the free ends of said radius arms for gripping said strip when said radius arms are in their depressed position; an actuating shaft for reciprocating said carriage plate; a crank formed on said shaft; a rod pivotally connected at one end on said crank; means for pivotally mounting said rod intermediate its ends on said carriage plate whereby the free end thereof is adapted to oscillate; means by which the oscillation of the free end of said rod is adapted to raise and depress the free ends of said radius arms; means for guiding the free end of said rod; and means for preventing lateral movement of said radius arms.

9. In combination, a vertically reciprocating crosshead mounted on guide rails, a crank to operate said crosshead and moving in a plane parallel thereto, a link connection between said crosshead and said crank and moving in a plane parallel to that of the said crosshead, an extension on said link extending beyond its pivotal center on the crosshead, arms pivotally mounted on the crosshead and extending upwardly terminating in L shaped pins adapted to engage the film perforations, a plate secured to the free ends of said arms having a cam slot engaged by the said upward extension of the link, said slot having two portions, offset with reference to each other, extending in a plane parallel to the movement of the said link, and an intermediate portion, connecting the aforementioned portions, extending in a plane oblique to said plane, substantially as and for the purpose set forth.

In testimony whereof, I have hereunto set my hand at Los Angeles, California, this 20th day of February, 1917.

CLARENCE J. COBERLY.